United States Patent [19]

Schulze, Jr.

[11] 4,012,675
[45] Mar. 15, 1977

[54] SWITCHING SYSTEM FOR SOLENOID RECIPROCATOR

[76] Inventor: Everett E. Schulze, Jr., 1357 Helena, Apt. 100, Aurora, Colo. 80011

[22] Filed: Aug. 4, 1975

[21] Appl. No.: 601,540

[52] U.S. Cl. .............................. 318/37; 318/129; 318/122; 318/134; 310/24; 310/35

[51] Int. Cl.² ..................................... H02K 33/00

[58] Field of Search ................ 310/23, 24, 34, 35; 318/122, 37, 128–134

[56] References Cited

UNITED STATES PATENTS

| | | | |
|---|---|---|---|
| 611,006 | 9/1898 | Whitfield | 310/24 X |
| 634,667 | 10/1899 | Hooper | 310/24 |
| 1,131,614 | 3/1915 | Radtko | 310/24 |
| 1,356,290 | 10/1920 | Kellum | 310/24 X |
| 2,056,719 | 10/1936 | Gelnaw | 310/35 X |
| 2,639,544 | 5/1953 | Coffin | 310/296 |
| 3,147,419 | 9/1964 | Cope | 318/129 |
| 3,454,957 | 7/1969 | Chaplenko | 318/122 |
| 3,832,608 | 8/1974 | Mills | 318/134 X |

Primary Examiner—Donovan F. Duggan

[57] ABSTRACT

A switching system for a solenoid reciprocator motor of a type which has a piston arranged to reciprocate into and out of a solenoid. The switch is an SCR rectifier and the trigger lead to close the switch is pulsed by a commutator operating in unison with the movement of the solenoid or a shaft rotated by the solenoid. The energizing cycle when the SCR switch is closed is terminated by a disconnect lead which is pulsed responsive to a subsequent contact of the circuit by the commutator. A preferred mode of pulsing the disconnect circuit is to associate the disconnect circuit with another solenoid of the motor whereby the first solenoid is turned off when the other solenoid is turned on by the commutator.

7 Claims, 7 Drawing Figures

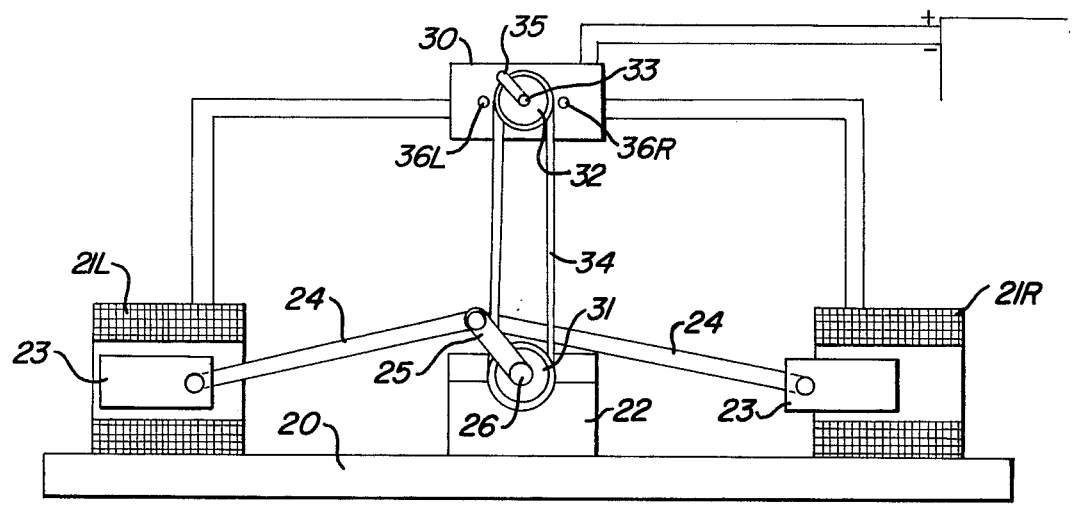
Fig _ 1
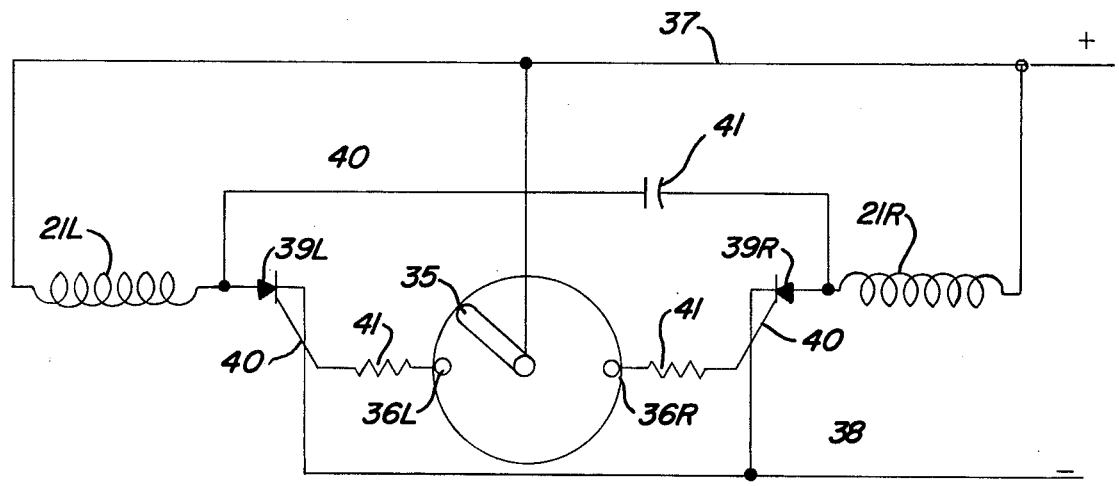
Fig _ 2
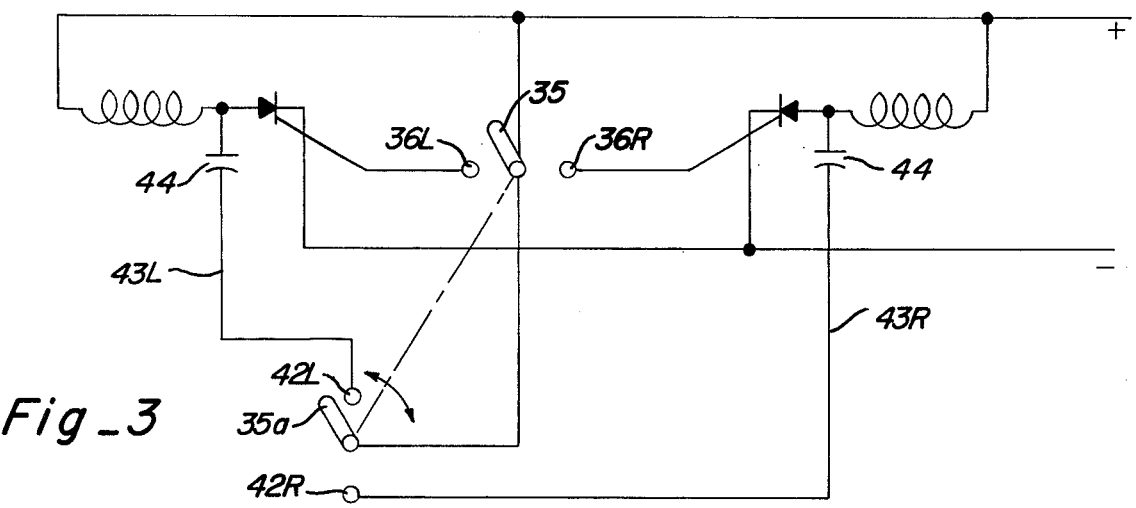
Fig _ 3

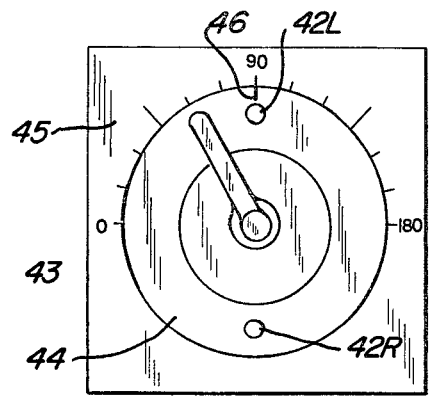
Fig_4
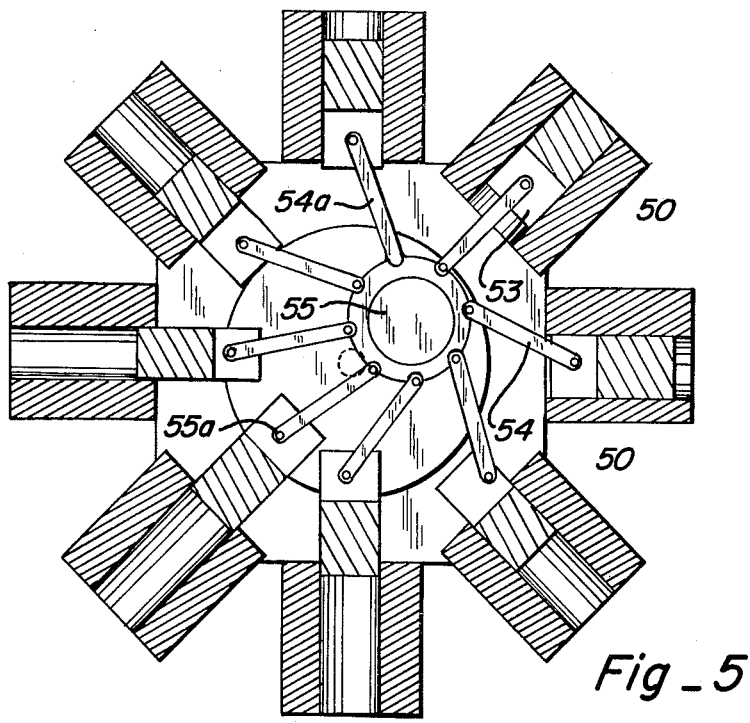
Fig_5
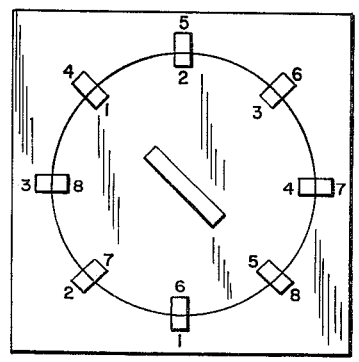
Fig_7

SWITCHING SYSTEM FOR SOLENOID RECIPROCATOR

This invention relates to magnetic electrical motors, and more particularly to solenoid reciprocator motors wherein the prime mover is a magnetizable core which moves into and out of a solenoid coil responsive to electrical currents in the coil.

Solenoid reciprocator motors of various types have been proposed and are in use. The basic movement of such a motor is to reciprocate a magnetizable core, referred to as the piston, within a solenoid coil by varying the electrical current in the coil. Such motors have been used as vibrators for etching tools and impact hammers, as pumps and also as rotary units. While a rotary unit may use only one piston, such units can also use two or more pistons in an opposing or radial arrangement about a crank shaft suggestive of the opposing and radial types of internal combustion engines. The advantages of a solenoid reciprocator motor reside in the fact that the performance at high speeds and low speeds will be about the same and also, that these motors can operate at an extremely high speed limited only by the magnetic saturation properties of the coil and piston.

The magnetic pull of a coil upon the core, the piston, will vary with the location of the piston with respect to the distance it is within the coil, the length of the piston and also its magnetic properties, and it becomes expedient to design the motor to take advantage of such variation insofar as possible. A general mode of operation is to provide a commutator which rotates with the engine to contact switching terminals to energize the individual solenoids of a motor for a selected cycle of the operation. These terminals are necessarily of a type which have a selected circumferential extent about the commutator arm so that the commutator arm may wipe these terminals for the selected cycle of operation, determined by the characteristics of the coil and piston. Such may be designated as a sweep type commutator in contrast with a commutator of the type where the arm momentarily engages a contact to produce a pulse, a pulse type. Certain problems have arisen with this arrangement in that the wiping contacts can easily wear, especially where the reciprocating motor is comparatively heavy requiring a substantially high power output conducive to arcing at the commutator. The result is the need for constant maintenance of the apparatus and in some instances, where solenoid reciprocator motors would be otherwise advantageous, they have been rejected for this reason.

The present invention was conceived and developed with the foregoing and other considerations in view and comprises, in essence, a switching system for a solenoid reciprocator motor which includes a silicon controlled rectifier, hereinafter called an SCR, in each solenoid circuit to act as a switch. The trigger lead of the SCR is connected to a commutator contact to close the SCR switch whenever the contact is contacted by a sweep arm. A disconnect lead in the solenoid circuit connected to another commutator contact to open the SCR switch, to turn off the circuit whenever this circuit is contacted by the sweep arm. This turn-off pulse generating lead may be associated with either a supplementary commutator or the circuits of other coils in the motor.

It follows that an object of the invention is to provide a novel and improved switching system for a solenoid reciprocator which can be easily cycled to take advantage of the operating characteristics of the solenoid.

Another object of the invention is to provide a novel and improved switching system for a solenoid reciprocator which is reliable in its operation and which requires an absolute minimum of maintenance.

Another object of the invention is to provide a novel and improved switching system for a solenoid reciprocator which is versatile in that it may be used effectively with various types of solenoid reciprocators.

Other objects of the invention are to provide in a switching system for a solenoid reciprocator an arrangement which is simple, economical and easily installed.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 1 is a sectional diagrammatic view of an opposed type of a solenoid reciprocator motor, including a commutator and the circuit leads from a power source to the commutator and the coils.

FIG. 2 is a circuit diagram of the solenoid reciprocator shown at FIG. 1.

FIG. 3 is similar to FIG. 2 but illustrating a modified circuit diagram commutator arrangement having adjustments to vary the on-period of cycles of the solenoids.

FIG. 4 is a diagrammatic view of a portion of the commutator structure which may be adjusted to vary the on-period cycles of the solenoids.

FIG. 5 is a sectional diagrammatic view of a radial type of a solenoid reciprocator engine using eight solenoids.

FIG. 7 is a somewhat diagrammatic view of a portion of the commutator structure used with a circuit as shown at FIG. 6 to permit the unit to be adjusted for varying the on-period cycles of each of the solenoids.

Figure 6:
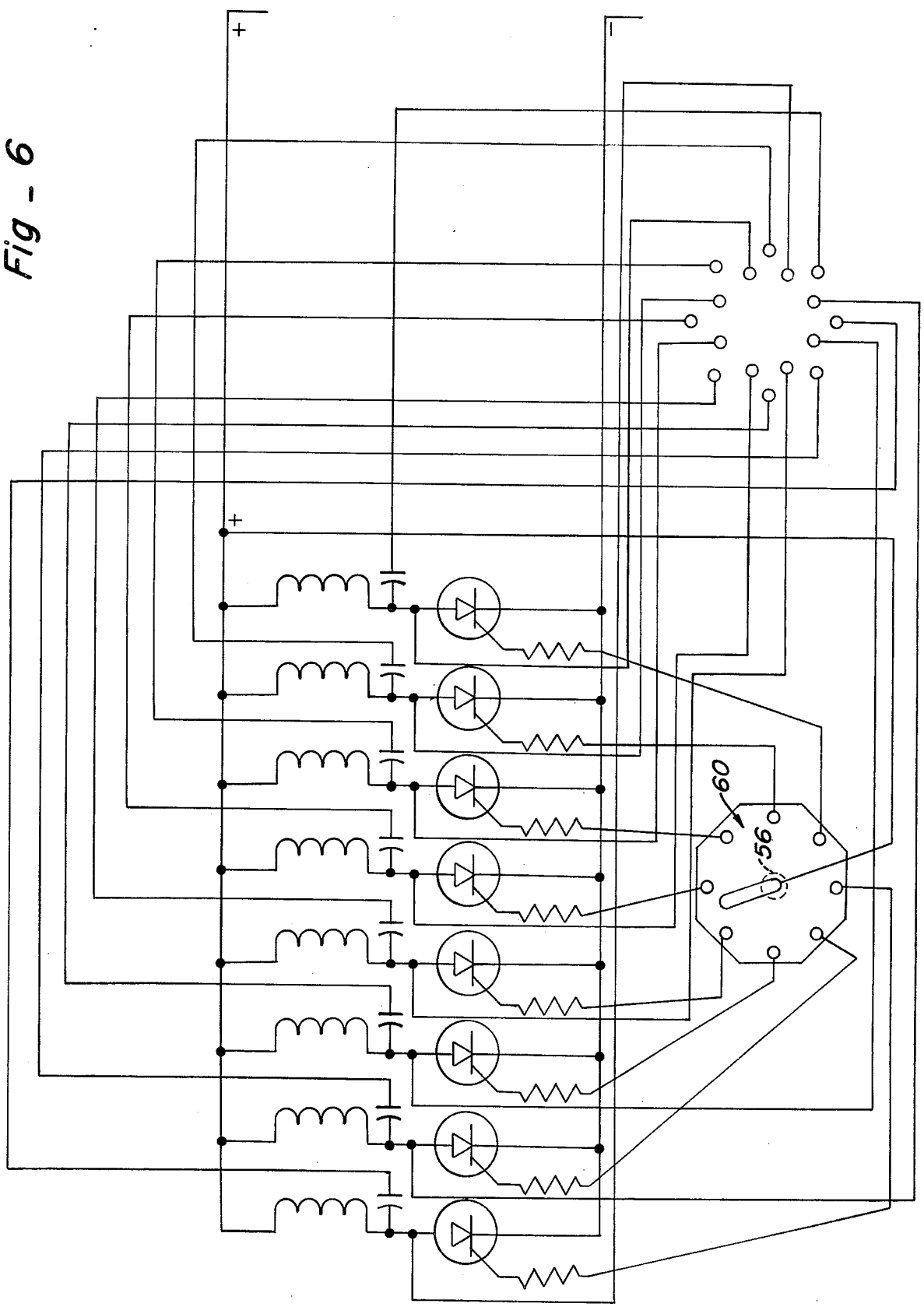
FIG. 6 is a circuit diagram for the reciprocator shown at FIG. 5.

Referring first to the arrangement illustrated at FIGS. 1 and 2, the opposed solenoid reciprocator shown at FIG. 1 is mounted upon a suitable elongated base 20 to carry two opposing solenoids 21R and 21L at opposite ends of this base. A drive shaft bearing 22 is carried upon the base between the solenoids. Magnetic pistons 23 are slidably carried in the solenoids 21R and 21L. Connecting rods 24 extend from these pistons to a crank 25 mounted upon a shaft 26 in the bearing 22. The spacing of the pistons with respect to the solenoid is such that these pistons reciprocate to move in and out of the solenoids in opposition to each other responsive to the magnetic pull of the solenoids as they are energized by electrical current. The reciprocation is effective to rotate the shaft 26.

In the present invention a direct current power source is provided to the apparatus and it is to be understood that this direct current power source may be supplied from batteries or from an alternating current source such as a 60 cycle, 110 volt power supply commonly available. If the latter power source is used, a rectifier, not shown, will convert that source to a DC power source for operation of the unit. Power is directed to the solenoids during selected cycles of their movement by a commutator 30 which is directly connected to the shaft 26 at any suitable manner as by a gear 31 on the shaft, connected with a gear 32 on the commutator shaft 33 by a chain 34. This commutator controls the operation of the reciprocator motor through a rotating wiping arm 35 on the shaft 33 which momentarily engages contacts 36R and 36L in the operative circuit of the unit to produce pulses in the circuit, now described.

As set forth in the circuit diagram shown at FIG. 2, the positive lead 37 from the power source connects to each solenoid 21R and 21L and to the wiper arm 35. The negative lead 38 of the power source connects with opposite ends of the solenoids 21R and 21L and each negative lead includes an SCR 39R and 39L respectively. A trigger lead 40, including a resistor 41, extends from each SCR 39R and 39L to the respective contacts 36R and 36L. To complete the circuitry, a cutoff lead 40' having a capacitor 41' within it extends from the positive side of one SCR to the positive side of the other SCR at a contact between the solenoid and the SCR.

The operation of this circuit is as follows: whenever the reciprocator is at rest, with the wiper arm 35 off the contacts 36R and 36L, no current is flowing into either coil. As rotation of the shaft commences, the wiper arm moves to a contact, for example, contact 36L. The open SCR 39L biases the trigger lead to the negative power lead to turn the SCR on and energize the solenoid 21L. The solenoid 21L then remains energized until the wiper arm 35 rotates 180° to engage the contact 36R to energize the opposite coil 21R. When the coil 21L was initially energized, the capacitor 41' of the cutoff lead 40' was charged with the positive charge being at the side of the solenoid coil 21R. However, as the wiper arm engaged the contact 36R, the SCR 39R closed to permit current to pass through the solenoid 21R. This reverses the charge on the capacitor 41 to reverse the bias at the SCR 39L to turn that SCR off and deenergize the solenoid 21L. The solenoid 21R then remains charged until the wiper arm rotates another 180 degrees to engage the contact 36L to repeat the cycle.

It is to be noted that the position of the wiper arm 35 on the shaft 33 may be shifted to cause the solenoids to energize at any selected position of the pistons 23 within their solenoids and not necessarily at their extreme positions. However, with the arrangement at FIG. 2, the solenoids 21R and 21L turned on and off at 180° cycles. Should it become desirable to vary the cycle of each solenoid to more or less than the 180° cycle, it will be necessary to modify the circuit as in the manner illustrated at FIG. 3. In that arrangement, a second wiper arm 35a is used to engage contacts 42 from individual cutoff leads 43R and 43L in lieu of the cutoff lead 40 heretofore described. Each cutoff lead is connected between its respective solenoid 21 and SCR 39 and will include a capacitor 44 equivalent to the capacitor 41' heretofore described. The operation of the apparatus is similar as that heretofore described. However, the wiper arm 35 engaging contacts 36R or 36L will turn the respective SCR on and the wiper arm 35a, engaging the respective contact 42R or 42L, will turn the SCR off. The relative position of the contacts 42 and the contacts 36 will determine the arc through which the shafts 26 and 33 will rotate with the respective solenoids energized.

It becomes expedient to provide a means for rotating the contacts 42 with respect to the contacts 36 to selectively vary this arc of movement. A simple mode of accomplishing this variation is indicated at FIG. 4 wherein a portion of the commutator 30, a frame 43', includes an adjustable rotor 44' centered upon the shaft 33 to carry the contacts 42. A scale 45 may be marked upon the frame 43' and a reference mark 46 may be provided on the rotor 42 thus permitting an operator to rotate the rotor 44' and easily shift the position of the contacts 42 with respect to the contacts 36 which are affixed to the frame of the commutator 30.

The radial solenoid motor illustrated at FIG. 5 is built somewhat similar to a conventional radial internal combustion engine. A circular frame 50 carries an array of solenoids 51, the drawing illustrating eight solenoids evenly spaced about the frame. Each solenoid carries a piston 53 from whence a connecting rod 54 extends to a crank 55 and in the arrangement shown, the connecting rods are all connected to a king rod 54a which is secured to the crank 55 by bearings 55a. The crank 55 is integral with a shaft 56, shown in broken lines in the drawing, which is secured in frame bearings not shown.

The motor is operated through a commutator 60 indicated diagrammatically in FIG. 6, the sweep arm 61 of which is directly connected to the drive shaft 56 to rotate in unison therewith. This connection is in any suitable manner, either by mounting the commutator on an end of the shaft or by use of gears and chain as indicated at FIG. 1. The position of the pistons 53, with respect to the solenoids, is such that they move in and out of their respective solenoids as the crank shaft rotates and the driving action of these pistons will be responsive to the magnetic pull of the solenoids as they are energized by electrical current.

The circuit diagram shown at FIG. 6 is similar to the circuit diagram of FIG. 2 although the number of individual components is necessarily greater. A negative lead and a positive lead from a direct current source is provided and each lead extends to each side of the eight solenoid coils in a parallel arrangement with each solenoid coil including an SCR rectifier at the negative side of the coil, the same as heretofore described. The commutator includes a rotor arm which rotates in unison with the shaft rotation to engage sequential contacts, each of which is connected to the trigger lead of the proper SCR rectifier. Accordingly, as the commutator arm rotates, it sequentially engages contacts for the eight SCR rectifiers in the respective solenoid circuits to turn on each solenoid in sequence. The solenoids are permitted to remain on for a selected portion or cycle of the shaft rotation and thereafter, they are turned off. Each silicon controlled rectifier is turned off as a subsequent silicon controlled rectifier is turned on by a pulsing lead, which includes a capacitor and extends from a connective point between the solenoid and the silicon controlled rectifier and the contact of a subsequent rectifier. Thus, as the commutator arm moves onto a contact point to energize the trigger lead of that point to open the solenoid circuit, the voltage change will cause a pulse at the previous silicon controlled rectifier to close that lead.

A slip ring switch having eight contacts on the ring and a corresponding eight contacts on the frame of the switch is provided in these pulsing leads to permit the turn off of a silicon controlled rectifier of one solenoid to occur as the next adjacent contact is engaged by the wiper arm, or at the second contact is engaged, or the third or fourth contact is engaged. In other words, the rotary switch may be positioned in such a manner as to permit two, three or four coils to be energized at one time.

The rotor switch includes eight spaced pulsing leads extending from eight contacts about this switch to the respective solenoids while the rotor of this switch includes eight corresponding contacts which connect with the main leads between the coils and the SCR rectifiers. The different combinations which can be obtained with this arrangement by rotation of the rotor is exemplified by the position illustrated at FIG. 7 where the slip ring switch is positioned with the disc connect circuit to the first solenoid SCR rectifier being connected with the fourth solenoid circuit whereby when the commutator arm engages the contact of the fourth solenoid the disc connect circuit of the first solenoid pulses to turn the first solenoid off. With this arrangement, the first solenoid will turn on when the commutator arm contacts the first contact and will remain on while the commutator arm contacts the second and third contacts and turn off when it moves onto the fourth contact. Shifting the slip ring switch shown at FIG. 7 permits the first solenoid to turn off at various angles such as 45°, 90°, 135° or 180° depending upon the positioning of the slip ring.

The firing or energizing of each solenoid is from 45° to 180° of rotation, as the piston moves from maximum exterior position in respect to the solenoid, to provide a rotation of 2100 rpm or more. The best operation for some purposes has been to initiate firing of the solenoid at 180° (further position of the piston out of the solenoid) since buildup of the magnetic field of the coil is relatively slow. However, the decay of the field is rapid so that deenergizing may occur a few degrees before top dead center of the piston. Also, it is possible to make the connecting rods or pins on the piston ring mounted on the shaft 1 to 2 inches off center. As the off-center amount increases, the torque increases. It is noted that the motor is a constant current device, and is of a low voltage making it adaptable for use with a fuel cell. The cylinders may be made with one-way valves to produce air pressure or reduced pressure (vacuum) to operate accessories of the unit.

It have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

I claim:

1. In a solenoid reciprocator motor which includes a solenoid, a piston adapted to reciprocate into and out of the solenoid, direct current power means to power the solenoid and commutator means rotating in unison with the reciprocation of the piston to apply power to the solenoid at intervals such as to drive the piston in its reciprocatory movement, the improvement comprising:
    a. a power circuit to the solenoid having an S.C.R. rectifier at the negative side of the solenoid as a switch to turn the power circuit off and on;
    b. a trigger lead from the S.C.R. rectifier to a contact to close the S.C.R. rectifier to turn the power circit on responsive to a positive pulse;
    c. a cutoff lead from the power circuit between the solenoid and the S.C.R. rectifier and to a second contact to open the S.C.R. rectifier to turn the power circuit off responsive to a positive pulse; and
    d. wherein said commutator means includes a rotatable arm connecting with the positive side of the power lead and rotatable responsive to reciprocation of the piston to engage the aforesaid contacts at selected cyclic intervals of the piston movement.

2. In a solenoid reciprocator motor according to claim 1 wherein a plurality of pistons are mounted radially on a rotatable shaft.

3. In a solenoid reciprocator motor according to claim 2 wherein said plurality of pistons are mounted in opposed pairs across the shaft.

4. In a solenoid reciprocator motor according to claim 1 wherein said trigger contact is arranged to be rotated with respect to the piston so as to energize said solenoid at from 45°–180° of the piston travel relative to said shaft.

5. In a solenoid reciprocator motor according to claim 4 wherein said trigger contact is rotated so as to energize said solenoid at about 180° of shaft rotation prior to movement of said piston into said solenoid.

6. In a solenoid reciprocator motor according to claim 1 wherein a plurality of pistons are mounted radially on a rotatable shaft, a circular disc mounting a plurality of trigger contacts for said SCR's, a sweep arm mounted for rotation on said shaft, and means for rotating said disc so as to change position of said contacts in relation to the position of the associated piston.

7. In a solenoid reciprocator motor according to claim 6 wherein each solenoid is energized about 180° ahead of the travel of each piston into each solenoid, and is deenergized about 180° of rotation thereafter.

* * * * *